United States Patent
Mileva et al.

(10) Patent No.: US 12,209,178 B2
(45) Date of Patent: *Jan. 28, 2025

(54) POLYPROPYLENE COMPOSITION FOR EXTERIOR AUTOMOTIVE APPLICATIONS

(71) Applicant: BOREALIS AG, Vienna (AT)

(72) Inventors: Daniela Mileva, Linz (AT); Susanne Margarete Kahlen, Linz (AT); Angelica Maëlle Delphine Legras, Linz (AT); Hermann Braun, Linz (AT); Christophe Salles, Courbevoie (FR)

(73) Assignee: BOREALIS AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/567,631

(22) PCT Filed: Jun. 7, 2022

(86) PCT No.: PCT/EP2022/065334
§ 371 (c)(1),
(2) Date: Dec. 6, 2023

(87) PCT Pub. No.: WO2022/258578
PCT Pub. Date: Dec. 15, 2022

(65) Prior Publication Data
US 2024/0262997 A1    Aug. 8, 2024

(30) Foreign Application Priority Data
Jun. 9, 2021   (EP) .................................... 21178566

(51) Int. Cl.
| C08L 23/12 | (2006.01) |
| C08K 3/34 | (2006.01) |
| C08L 23/16 | (2006.01) |

(52) U.S. Cl.
CPC .............. *C08L 23/12* (2013.01); *C08L 23/16* (2013.01); *C08K 3/34* (2013.01); *C08L 2205/025* (2013.01); *C08L 2205/03* (2013.01); *C08L 2205/035* (2013.01); *C08L 2207/02* (2013.01); *C08L 2207/20* (2013.01)

(58) Field of Classification Search
CPC .......... C08L 23/10; C08L 23/12; C08L 23/16; C08L 2205/025; C08L 2205/03; C08L 2205/04; C08L 2207/02; C08L 2207/04; C08L 2207/20; C08K 3/34
See application file for complete search history.

(56) References Cited

U.S. PATENT DOCUMENTS

| 9,611,382 B2 | 4/2017 | Kock et al. |
| 10,450,451 B2 | 10/2019 | Wang et al. |
| 11,203,683 B2* | 12/2021 | Kahlen ................... C08L 23/12 |
| 2015/0166776 A1 | 6/2015 | Kock |
| 2017/0044359 A1 | 2/2017 | Kahlen et al. |
| 2020/0385555 A1 | 12/2020 | Kahlen |
| 2023/0257563 A1* | 8/2023 | Kahlen ................... C08L 23/12 524/451 |
| 2023/0287202 A1* | 9/2023 | Kahlen ................... C08L 23/12 |
| 2023/0348705 A1* | 11/2023 | Wang ....................... C08L 23/12 |
| 2024/0059883 A1* | 2/2024 | Kahlen ................... C08L 23/10 |

FOREIGN PATENT DOCUMENTS

| EA | 033398 B1 | 10/2019 |
| EP | 491566 B1 | 9/1992 |
| EP | 0586390 B1 | 3/1994 |
| EP | 591224 B1 | 4/1994 |
| EP | 2960256 B1 | 12/2015 |
| EP | 2960279 B1 | 12/2015 |
| EP | 3359600 A1 | 4/2017 |
| EP | 3359600 B1 | 8/2018 |
| JP | 58168649 A | 10/1983 |
| JP | 6-320689 A | 11/1994 |
| JP | 9-208797 A | 8/1997 |
| JP | 2016176061 A | 10/2016 |
| JP | 2018-532859 A | 11/2018 |
| JP | 2020-73685 A | 5/2020 |
| KR | 1020180051641 A | 5/2018 |
| KR | 102018006257 A | 6/2018 |
| RU | 2699996 C1 | 9/2019 |
| WO | 2015/169690 A1 | 11/2015 |

(Continued)

OTHER PUBLICATIONS

Busico, V. et al. Alk-1-ene Polymerization in the Presence of a Monocyclopentadienyl Zirconium(IV) Acetamidinate Catalyst: Microstructural and Mechanistic Insights, Macromol. Rapid Commun. 2007, 28, 1128.

(Continued)

*Primary Examiner* — Rip A Lee
(74) *Attorney, Agent, or Firm* — Tarolli, Sundheim, Covell & Tummino LLP

(57) ABSTRACT

A composition suitable for automotive application obtainable by blending at least components (A), (B), (C) and (D): (A) 15 wt.-% to 50 wt.-%, preferably 18 to 44 wt.-%, more preferably 20 to 40 wt.-% of a mixed-plastics polypropylene blend; (B) 20 wt.-% to 50 wt.-%, preferably 22 to 47 wt.-%, more preferably 25 to 45 wt.-% of a heterophasic propylene copolymer; (C) 5 wt.-% to 25 wt.-%, preferably 7 to 23 wt.-%, more preferably 10 to 22 wt.-% of an ethylene-based plastomer and (D) 5 wt.-% to 25 wt.-%, preferably 7 to 22 wt.-%, more preferably 10 to 20 wt.-% of an inorganic filler.

13 Claims, No Drawings

(56) References Cited

FOREIGN PATENT DOCUMENTS

| WO | 2016/066446 | A1 | | 5/2016 | |
| WO | 2017/060139 | A1 | | 4/2017 | |
| WO | 2018/206353 | A1 | | 11/2018 | |
| WO | WO-2022258576 | A1 | * | 12/2022 | .............. C08L 23/12 |

OTHER PUBLICATIONS

Cheng, H. N., 13C NMR Analysis of Ethylene-Propylene Rubber, Macromolecules 17 (1984), 1950.

Singh, G., et al. Triad sequence determination of ethylene—propylene copolymers—application of quantitative 13C NMR Polymer Testing 28 5 (2009), 475).

Wang, Wen-Jun, et al. Structural Analysis of Ethylene/Propylene Copolymers Synthesized with a Constrained Geometry Catalyst, Macromolecules 2000, 33, 1157-1162.

Zhou, Zhe, et al., A new decoupling method for accurate quantification of polyethylene copolymer composition and triad sequence distribution with 13C NMR, Journal of Magnetic Resonance 187 (2007) 225-233.

Jeremic, Ljiljana, et al. Rapid characterization of high-impact ethylene-propylene copolymer composition by crystallization extraction separation: comparability to standard separation methods, International Journal of Polymer Analysis and Characterization, 25:8, 581-596, Sep. 24, 2020.

European Application No. 21178566.2, Search Report dated Nov. 29, 2021.

Japanese Application No. 2023-575445, Office Action dated Jun. 11, 2024.

Russian Application No. 2023135841, Office Action dated Jun. 28, 2024.

Bychuk, Preparation and Properties of Polymer Films Based on Poly-3-hydroxybutyrate and Polycaprolactone, Ph.D. Thesis, Moscow 2016.

Basov, N.I. etc. Quality Control of polymeric materials, Ed. V.A. Braginsky, 2nd ed., Leningrad, Chemistry Publishing House, 1990.

Chinese Application No. 202280040687.4, Office Action dated Jun. 11, 2024.

Korean Application No. 10-2024-7000371, Decision to Grant dated Oct. 10, 2024.

* cited by examiner

POLYPROPYLENE COMPOSITION FOR EXTERIOR AUTOMOTIVE APPLICATIONS

The present invention relates to polypropylene compositions suitable especially for automotive exterior applications comprising mixed plastics polypropylene-based blends and inorganic fillers.

TECHNICAL BACKGROUND

Compositions suitable for the automotive industry typically contain one or more heterophasic polypropylene copolymer(s), and/or random heterophasic copolymers, and conventionally some inorganic filler.

One of the fundamental problems in polymer business is recycling. At the moment, the market for recyclates, particularly recyclates from household trash, commonly denoted PCR ('post-consumer resins') is somewhat limited. Starting from household trash, the sorting and separation processes employed will not allow preparing pure polymers, i.e. there will always be some contaminants, or the processes may even result in blends of different polymers. When it comes to polyolefins, which constitute the vast majority of the polymer fraction of the collected household trash, a perfect separation of polypropylene and polyethylene is hardly possible. Recycled polyolefin materials, particularly post-consumer resins, are conventionally cross-contaminated with non-polyolefin materials such as polyethylene terephthalate, polyamide, polystyrene or non-polymeric substances like wood, paper, glass or aluminum. Even worse, those post-consumer recycled polyolefin materials are readily available on a multi-ton scale but unfortunately have limited mechanical properties and frequently severe odor and/or emission problems.

For exterior applications in the automotive industry materials are required with good flowability, paintability, surface appearance and balanced mechanical properties in terms of stiffness, toughness. Recently, the demand of the market has expanded in direction of using recycled polyolefins in blends with virgin polymers in order to fulfil specific requirements.

However, there is a deeply felt need for allowing the dumping and reuse of post-consumer polyolefin recyclates in final products without health and safety hazards.

Non-published patent application EP 20 190 838.1 is related to polypropylene compositions for automotive applications which contain mixed plastics polypropylene-based blends originating from post-consumer recycled polyolefin streams, ethylene-based plastomers and inorganic fillers, such as talc. These compositions show beneficial VOC properties and impact properties so that these compositions can replace sophisticated heterophasic polypropylene copolymers in automotive applications. However, these compositions still show deficiencies in mechanical properties and flowability.

The present invention is based on the surprising finding that by carefully selecting the heterophasic propylene copolymer based virgin component in polypropylene based compositions, which contain mixed plastics polypropylene-based blends originating from post-consumer recycled polyolefin streams, ethylene-based plastomers and inorganic fillers, such as talc, polypropylene based compositions with a superior balance of properties in regard of impact properties, heat stability, paintability and especially mechanical properties, such as in tensile properties, and flowability, shown in a high melt flow rate. Thus, the compositions of the invention comprising mixed plastics polypropylene-based blends originating from post-consumer recycled polyolefin streams qualify for injection moulding applications, especially in the automotive area, such as exterior automotive applications, and can replace sophisticated heterophasic polypropylene copolymers.

SUMMARY OF THE INVENTION

The present invention relates to a composition suitable for automotive applications obtainable by blending at least components (A), (B), (C) and (D)
- (A) 15 wt.-% to 50 wt.-%, preferably 18 to 44 wt.-%, more preferably 20 to 40 wt.-% of a mixed-plastics polypropylene blend;
- (B) 20 wt.-% to 50 wt.-%, preferably 22 to 47 wt.-%, more preferably 25 to 45 wt.-% of a heterophasic propylene copolymer;
- (C) 5 wt.-% to 25 wt.-%, preferably 7 to 23 wt.-%, more preferably 10 to 22 wt.-% of an ethylene-based plastomer and
- (D) 5 wt.-% to 25 wt.-%, preferably 7 to 22 wt.-%, more preferably 10 to 20 wt.-% of an inorganic filler;

whereby all percentages refer to the total composition, and whereby the mixed-plastics polypropylene blend (A) has
- a crystalline fraction (CF) content determined according to CRYSTEX QC analysis in the range from 85.0 to 96.0 wt.-%, preferably in the range from 86.5 to 95.5 wt.-%, and
- a soluble fraction (SF) content determined according to CRYSTEX QC analysis in the range from 4.0 to 15.0 wt.-%, preferably in the range from 4.5 to 13.5 wt.-%, whereby
- said crystalline fraction (CF) has an ethylene content (C2(CF)), as determined by FT-TR spectroscopy calibrated by quantitative $^{13}$C-NMR spectroscopy, in the range from 1.0 to 10.0 wt.-%, preferably in the range of 1.5 to 9.5 wt.-%; and
- said soluble fraction (SF) has an intrinsic viscosity (iV (SF)), as determined in decalin according to DIN ISO 1628/1 at 135° C., in the range from 0.9 to 2.1 dl/g, preferably in the range of 1.0 to 2.0 dl/g, more preferably in the range of 1.1 to 1.9 dl/g;

the heterophasic propylene copolymer (B) comprises a matrix phase and an elastomer phase dispersed therein and has
- a melt flow rate $MFR_2$ (230° C., 2.16 kg, ISO 1133) of 85 to 250 g/10 min, preferably 90 to 150 g/10 min, more preferably 95 to 125 g/10 min;
- a soluble fraction (SF) determined according to CRYSTEX QC analysis in the range from more than 20.0 wt.-% to 30.0 wt.-%; and
- an intrinsic viscosity of said soluble fraction, iV(SF) as measured in decalin according to DIN ISO 1628/1 at 135° C., of 2.0 dl/g to 4.5 dl/g, preferably of 2.4 to 3.8 dl/g, more preferably of 2.5 to 3.7 dl/g;

the ethylene based plastomer (C) being a copolymer of ethylene with comonomer units selected from alpha-olefins having from 3 to 12 carbon atoms, preferably from alpha-olefins having from 4 to 10 carbon atoms, most preferably from 1-butene or 1-octene, has
- a melt flow rate $MFR_2$ (190° C., 2.16 kg, ISO 1133) of 0.2 to 2.5 g/10 min, preferably 0.3 to 2.0 g/10 min; and
- a density of 850 to 870 kg/m$^3$, preferably from 855 to 865 kg/m$^3$ the composition has a
- a melt flow rate $MFR_2$ (230° C., 2.16 kg, ISO 1133) of 8 to 50 g/10 min, preferably of 10 to 48 g/10 min, more preferably of 11 to 45 g/10 min.

Further, the present invention relates to an article, preferably a moulded article, more preferably a moulded automotive article comprising the composition as described above or below.

Still further, the present invention relates to the use of the composition as described above or below for injection molding of articles, preferably automotive articles, more preferably automotive exterior articles.

Definitions

Unless defined otherwise, all technical and scientific terms used herein have the same meaning as commonly understood by one of ordinary skill in the art to which the invention pertains. Although, any methods and materials similar or equivalent to those described herein can be used in practice for testing of the present invention, the preferred materials and methods are described herein. In describing and claiming the present invention, the following terminology will be used in accordance with the definitions set out below. Unless clearly indicated otherwise, use of the terms "a," "an," and the like refers to one or more.

Mixed plastics is defined as the presence of low amounts of compounds usually not found in virgin polypropylene blends such as polystyrenes, polyamides, polyesters, wood, paper, limonene, aldehydes, ketones, fatty acids, metals, and/or long term decomposition products of stabilizers. Virgin polypropylene blends denote blends as directly originating from the production process without intermediate use.

As a matter of definition "mixed plastics" can be equated with detectable amounts of polystyrene and/or polyamide-6 and/or limonene and/or fatty acids.

Mixed plastics thereby can originate from both post-consumer waste and industrial waste, as opposed to virgin polymers. Post-consumer waste refers to objects having completed at least a first use cycle (or life cycle), i.e. having already served their first purpose. In contrast to that, industrial waste refers to manufacturing scrap, respectively conversion scrap, which does not normally reach a consumer.

It will be understood by those skilled in the art that a soluble fraction (SF) as obtained by CRYSTEX QC analysis having an intrinsic viscosity (iV(SF)) in the range from 0.9 to below 2.2 dl/g is typically found in material from recycling streams. In a preferred aspect of the invention the soluble fraction (SF) as obtained by CRYSTEX QC analysis has an intrinsic viscosity (iV(SF)) in the range from 0.9 to 2.1 dl/g.

A polymer blend is a mixture of two or more polymeric components. In general, the blend can be prepared by mixing the two or more polymeric components. A suitable mixing procedures known in the art is post-polymerization blending.

Post-polymerization blending can be dry blending of polymeric components such as polymer powders and/or compounded polymer pellets or melt blending by melt mixing the polymeric components.

A propylene homopolymer is a polymer, which essentially consists of propylene monomer units. Due to impurities especially during commercial polymerization processes a propylene homopolymer can comprise up to 0.1 mol % comonomer units, preferably up to 0.05 mol % comonomer units and most preferably up to 0.01 mol % comonomer units.

"Polypropylene-polyethylene blend" refers to a composition containing both polypropylene and polyethylene including also polypropylene copolymers as well as polyethylene copolymers. As a direct determination of the polypropylene content and polyethylene content is not possible, the weight ratio polypropylene (A-1) to polyethylene (A-2) of 19:1 to 7:3 denotes the equivalent ratio as determined from calibration by iPP and HDPE and determination by IR spectroscopy.

A polypropylene means a polymer being composed of units derived from propylene in an amount of more than 50 mol-%.

A polyethylene means a polymer being composed of units derived from ethylene in an amount of more than 50 mol-%.

The term "elastomer" denotes a natural or synthetic polymer having elastic properties. The term "plastomer" denotes a natural or synthetic polymer having which combines qualities of elastomers and plastics, such as rubber-like properties with the processing ability of plastic. An ethylene based plastomer means a plastomer being composed of units derived from ethylene in an amount of more than 50 mol %.

The presence of a heterophasic nature can be easily determined by the number of glass transition points, like in dynamic-mechanical analysis (DMA), and/or high resolution microscopy, like scanning electron microscopy (SEM), transmission electron microscopy (TEM) or atomic force microscopy (AFM).

The term "XCS" refers to the xylene cold soluble fraction (XCS wt.-%) determined at 25° C. according to ISO 16152. The term "XCI" refers to the xylene cold insoluble fraction (XCI wt.-%) determined at 25° C. according to ISO 16152.

Reactor blend is a blend originating from the production in two or more reactors coupled in series or in a reactor having two or more reaction compartments. A reactor blend may alternatively result from blending in solution. A reactor blend stands in contrast to a compound as produced by melt extrusion.

If not indicated otherwise "%" refers to weight-% (wt.-%).

DETAILED DESCRIPTION

Composition

In a first aspect, the present invention relates to a composition suitable for automotive applications obtainable by blending at least components (A), (B), (C) and (D)

(A) 15 wt.-% to 50 wt.-%, preferably 18 to 44 wt.-%, more preferably 20 to 40 wt.-% of a mixed-plastics polypropylene blend;

(B) 20 wt.-% to 50 wt.-%, preferably 22 to 47 wt.-%, more preferably 25 to 45 wt.-% of a heterophasic propylene copolymer;

(C) 5 wt.-% to 25 wt.-%, preferably 7 to 23 wt.-%, more preferably 10 to 22 wt.-% of an ethylene-based plastomer and (D) 5 wt.-% to 25 wt.-%, preferably 7 to 22 wt.-%, more preferably 10 to 20 wt.-% of an inorganic filler;

whereby all percentages refer to the total composition, and whereby the mixed-plastics polypropylene blend (A) has a crystalline fraction (CF) content determined according to CRYSTEX QC analysis in the range from 85.0 to 96.0 wt.-%, preferably in the range from 86.5 to 95.5 wt.-%, and a soluble fraction (SF) content determined according to CRYSTEX QC analysis in the range from 4.0 to 15.0 wt.-%, preferably in the range from 4.5 to 13.5 wt.-%, whereby said crystalline fraction (CF) has an ethylene content (C2(CF)), as determined by FT-IR spectroscopy calibrated by quantitative $^{13}$C-NMR spectroscopy, in the range from 1.0 to 10.0 wt.-%, preferably in the range from 1.5 to 9.5 wt.-%; and said soluble fraction (SF) has an intrinsic viscosity (iV (SF)), as measured in decalin according to DIN ISO 1628/1 at 135° C., in the range from 0.9 to 2.1 dl/g, preferably in the range from 1.0 to 2.0 dl/g, more preferably in the range from 1.1 to 1.9 dl/g;

the heterophasic propylene copolymer (B) comprises a matrix phase and an elastomer phase dispersed therein and has a melt flow rate $MFR_2$ (230° C., 2.16 kg, ISO 1133) of 85 to 250 g/10 min, preferably 90 to 150 g/10 min, more preferably 95 to 125 g/10 min;

a soluble fraction (SF) content determined according to CRYSTEX QC analysis in the range from more than 20.0 wt.-% to 30.0 wt.-%; and an intrinsic viscosity of said soluble fraction iV(SF), as measured in decalin according to DIN ISO 1628/1 at 135° C., of 2.0 dl/g to 4.5 dl/g, preferably of 2.4 to 3.8 dl/g, more preferably of 2.5 to 3.7 dl/g;

the ethylene based plastomer (C) being a copolymer of ethylene with comonomer units selected from alpha-olefins having from 3 to 12 carbon atoms, preferably from alpha-olefins having from 4 to 10 carbon atoms, most preferably from 1-butene or 1-octene, has a melt flow rate $MFR_2$ (190° C., 2.16 kg, ISO 1133) of 0.2 to 2.5 g/10 min, preferably 0.3 to 2.0 g/10 min; and a density of 850 to 870 kg/m$^3$, preferably from 855 to 865 kg/m3 the composition has a a melt flow rate $MFR_2$ (230° C., 2.16 kg, ISO 1133) of 8 to 50 g/10 min, preferably 10 to 48 g/10 min, more preferably 11 to 45 g/10 min.

The composition suitable for automotive application according to the present invention is particularly suitable for injection molding of articles to be used on the exterior of vehicles.

The composition suitable for automotive application according to the present invention has one or more of the following characteristics:

The composition has a melt flow rate $MFR_2$ (230° C., 2.16 kg, ISO 1133) of 8 to 50 g/10 min, preferably 10 to 48 g/10 min, more preferably 11 to 45 g/10 min.

The composition can be characterized by CRYSTEX QC analysis. In the CRYSTEX QC analysis a crystalline fraction (CF) and a soluble fraction (SF) are obtained which can be quantified and analyzed in regard of the monomer and comonomer content as well as the intrinsic viscosity (iV).

The composition preferably shows one or all of the following properties in the CRYSTEX QC analysis:

a crystalline fraction (CF) content determined according to CRYSTEX QC analysis in the range from 55.0 to 75.0 wt.-%, preferably 60.0 to 72.0 wt.-%, and a soluble fraction (SF) content determined according to CRYSTEX QC analysis in the range from 25.0 to 45.0 wt.-%, preferably 28.0 to 40.0 wt.-%.

Said crystalline fraction (CF) preferably has one or more, preferably all of the following properties:

an ethylene content (C2(CF)), as determined by FT-IR spectroscopy calibrated by quantitative $^{13}$C-NMR spectroscopy, of less than 10.0 wt.-%, preferably of 2.5 to 7.5 wt.-%; and/or an intrinsic viscosity (iV(CF)), as measured in decalin according to DIN ISO 1628/1 at 135° C., of less than 1.8 dl/g, preferably of 0.8 to 1.6 dl/g.

Said soluble fraction (SF) preferably has one or more, preferably all of the following properties:

an ethylene content (C2(SF)), as determined by FT-TR spectroscopy calibrated by quantitative $^{13}$C-NMR spectroscopy, in the range from 45.0 to 65.0 wt.-%, preferably from 46.0 to 63.0 wt.-%; and/or an intrinsic viscosity (iV(SF)), as measured in decalin according to DIN ISO 1628/1 at 135° C., of more than 1.6 dl/g, preferably of 1.7 to 2.7 dl/g.

The composition preferably comprises units derived from ethylene in an amount of from 12.5 to 32.5 wt.-%, more preferably from 15.0 to 30.0 wt.-%, still more preferably from 17.0 to 28.0 wt.-%.

The composition according to the invention preferably shows a superior balance of properties in regard of impact properties, heat stability, flowability, as can be seen from the melt flow rate described above, and especially mechanical properties, such as in in regard of the flexural modulus or tensile properties.

The composition preferably has a flexural modulus of from 1400 MPa to 2000 MPa, preferably from 1450 MPa to 1950 MPa.

Further, the composition preferably has a Charpy Notched Impact Strength at 23° C. (CNIS at 23° C.) of from 20.0 kJ/m$^2$ to 65.0 kJ/m$^2$, preferably from 21.0 kJ/m$^2$ to 60.0 kJ/m$^2$.

Further, the composition preferably has a Charpy Notched Impact Strength at −20° C. (CNIS at −20° C.) of from 4.0 kJ/m$^2$ to 10.0 kJ/m$^2$, preferably from 4.5 kJ/m$^2$ to 7.5 kJ/m$^2$.

Still more preferably, the composition has very good impact strength in the instrumented puncture test:

The composition preferably has a puncture energy, measured at 23° C., of from 25 to 55 J, preferably from 30 to 50 J.

The composition preferably has an energy at maximum force, measured at 23° C., of from 15 to 45 J, preferably from 18 to 40 J.

Further, the composition preferably has a puncture energy, measured at −30° C., of from 12 to 40 J, preferably from 13 to 38 J.

The composition preferably has an energy at maximum force, measured at −30° C., of from 10 to 30 J, preferably from 11 to 28 J.

Additionally, the composition preferably has a heat deflection temperature (ISO 75 B) of more than 90° C., preferably from 91° C. to 110° C.

Further, the composition preferably has a coefficient of linear thermal expansion (CLTE) of from 60 to 100 μm/mK, preferably from 65 to 90 μm/mK.

The composition of the invention mandatorily comprises components (A), (B), (C) and (D) as described above or below in the accordantly described amounts.

The composition can optionally comprise additional polymeric components so that the composition may be obtainable by blending components (A), (B), (C) and one or more of the following components:

(E) 0 to 20 wt.-%, preferably 0 to 18 wt.-%, more preferably 0 to 17 wt.-% of a second heterophasic propylene copolymer; and (F) 0 to 10 wt.-%, preferably 0 to 9 wt.-%, more preferably 0 to 8 wt.-% of a propylene homopolymer;

whereby all percentages refer to the total composition, and whereby the second heterophasic propylene copolymer (E) comprises a matrix phase and an elastomer phase dispersed therein and has a melt flow rate $MFR_2$ (230° C., 2.16 kg, ISO 1133) of 2 to 10 g/10 min, preferably of 3 to 8 g/10 min, more preferably 3.5 to 7.5 g/10 min;

a soluble fraction (SF) content determined according to CRYSTEX QC analysis of more than 20.0 to 50.0 wt.-%, preferably of 21.0 to 45.0 wt.-%; and an intrinsic viscosity of said soluble fraction iV(SF), measured in decalin according to DIN ISO 1628/1 at 135° C., of 4.0 dl/g to 10.0 dl/g, preferably of 4.5 to 9.5 dl/g, more preferably of 5.0 to 9.0 dl/g of the xylene cold soluble fraction (XCS) content;

the propylene homopolymer (F) has a melt flow rate $MFR_2$ (230° C., 2.16 kg, ISO 1133) of 800 to 2000 g/10 min, preferably 900 to 1600 g/10 min, more preferably 1000 to 1500 g/10 min.

In one embodiment, the composition is obtainable by blending components (A), (B), (C) and (D), with (E) and (F) not being present, (A) 15 wt.-% to 50 wt.-%, preferably 18 to 44 wt.-%, more preferably 20 to 40 wt.-% of a mixed-plastics polypropylene blend;

(B) 30 wt.-% to 50 wt.-%, preferably 32 to 47 wt.-%, more preferably 35 to 45 wt.-% of a heterophasic propylene copolymer;

(C) 5 wt.-% to 25 wt.-%, preferably 7 to 23 wt.-%, more preferably 10 to 22 wt.-% of an ethylene-based plastomer and (D) 5 wt.-% to 25 wt.-%, preferably 7 to 22 wt.-%, more preferably 10 to 20 wt.-% of an inorganic filler, whereby all percentages refer to the total composition.

In another embodiment, the composition is obtainable by blending components (A), (B), (C), (D) and (E), with (F) not being present, (A) 15 wt.-% to 40 wt.-%, preferably 18 to 37 wt.-%, more preferably 20 to 38 wt.-% of a mixed-plastics polypropylene blend;

(B) 20 wt.-% to 50 wt.-%, preferably 22 to 47 wt.-%, more preferably 25 to 45 wt.-% of a heterophasic propylene copolymer;

(C) 5 wt.-% to 25 wt.-%, preferably 7 to 23 wt.-%, more preferably 10 to 22 wt.-% of an ethylene-based plastomer;

(D) 5 wt.-% to 25 wt.-%, preferably 7 to 22 wt.-%, more preferably 10 to 20 wt.-% of an inorganic filler; and (E) 5 to 20 wt.-%, preferably 7 to 18 wt.-%, more preferably 10 to 17 wt.-% of a second heterophasic propylene copolymer, whereby all percentages refer to the total composition.

In yet another embodiment, the composition is obtainable by blending components (A), (B), (C), (D) and (F), with (E) not being present, (A) 15 wt.-% to 40 wt.-%, preferably 18 to 37 wt.-%, more preferably 20 to 38 wt.-% of a mixed-plastics polypropylene blend;

(B) 20 wt.-% to 50 wt.-%, preferably 22 to 47 wt.-%, more preferably 25 to 45 wt.-% of a heterophasic propylene copolymer;

(C) 5 wt.-% to 25 wt.-%, preferably 7 to 23 wt.-%, more preferably 10 to 22 wt.-% of an ethylene-based plastomer;

(D) 5 wt.-% to 25 wt.-%, preferably 7 to 22 wt.-%, more preferably 10 to 20 wt.-% of an inorganic filler; and (F) 2 wt.-% to 10 wt.-%, preferably 3 to 9 wt.-%, more preferably 4 to 8 wt.-% of a propylene homopolymer, whereby all percentages refer to the total composition.

Mixed-Plastics Polypropylene Blend (A)

The mixed-plastics polypropylene blend (A) is suitably characterized by CRYSTEX QC analysis. In the CRYSTEX QC analysis, a crystalline fraction (CF) and a soluble fraction (SF) are obtained which can be quantified and analyzed in regard of the monomer and comonomer content as well as the intrinsic viscosity (iV).

The mixed-plastics polypropylene blend (A) shows the following properties in the CRYSTEX QC analysis:

a crystalline fraction (CF) content determined according to CRYSTEX QC analysis in the range from 85.0 to 96.0 wt.-%, preferably in the range from 86.5 to 95.5 wt.-%, more preferably in the range from 88.0 to 95.0 wt.-%, and a soluble fraction (SF) content determined according to CRYSTEX QC analysis in the range from 4.0 to 15.0 wt %, preferably in the range from 4.5 to 13.5 wt.-%, more preferably in the range from 5.0 to 12.0 wt.-%.

Said crystalline fraction (CF) has one or more, preferably all of the following properties:

an ethylene content (C2(CF)), as determined by FT-IR spectroscopy calibrated by quantitative $^{13}$C-NMR spectroscopy, in the range from 1.0 to 10.0 wt.-%, preferably in the range from 1.5 to 9.5 wt.-%, more preferably in the range from 2.0 to 9.0 wt.-%; and/or an intrinsic viscosity (iV(CF)), as measured in decalin according to DIN ISO 1628/1 at 135° C., preferably in the range from 1.0 to below 2.6 dl/g, more preferably in the range from 1.2 to 2.5 dl/g, still more preferably in the range from 1.3 to 2.4 dl/g.

Said soluble fraction (SF) has one or more, preferably all of the following properties:

an ethylene content (C2(SF)), as determined by FT-TR spectroscopy calibrated by quantitative $^{13}$C-NMR spectroscopy, preferably in the range from 20.0 to 55.0 wt.-%, preferably in the range from 22.0 to 50.0 wt.-%, more preferably in the range from 24.0 to 48.0 wt.-%; and/or an intrinsic viscosity (iV(SF)), as measured in decalin according DIN ISO 1628/1 at 135° C., in the range from 0.9 to 2.1 dl/g, preferably in the range from 1.0 to 2.0 dl/g, more preferably in the range from 1.1 to 1.9 dl/g.

Preferably, the mixed-plastics polypropylene blend (A) comprises polypropylene and polyethylene.

The weight ratio of polypropylene to polyethylene is preferably from 19:1 to 7:3.

The mixed-plastics polypropylene blend (A) preferably comprises units derived from propylene in an amount of more than 50 mol-%.

The mixed-plastics polypropylene blend (A) preferably comprises units derived from ethylene in an amount of from 2.5 to 15.0 wt.-%, more preferably from 4.0 to 12.5 wt.-%, still more preferably from 5.0 to 10.0 wt.-%.

Further, the mixed-plastics polypropylene blend (A) preferably has one or more, preferably all of the following properties:

a melt flow rate $MFR_2$ (230° C., 2.16 kg, ISO1133) of 8.0 to 40 g/10 min, preferably of 9.0 to 35 g/10 min, more preferably of 10.0 to 30 g/10 min; and/or a limonene content as determined by using solid phase microextraction (HS-SPME-GC-MS): 0.1 ppm to 50 ppm; and/or a tensile modulus of from 1000 MPa to 1500 MPa, preferably from 1100 MPa to 1400 MPa; and/or a Charpy Notched Impact Strength at 23° C. (CNIS at 23° C.) of from 3.0 to 7.5 $kJ/m^2$, preferably from 4.0 to 7.0 $kJ/m^2$.

The mixed-plastics polypropylene blend according to the present invention is preferably present in the form of pellets. Pelletization contributes to the low amounts of volatile substances.

Heterophasic Propylene Copolymer (B)

The heterophasic polypropylene copolymer (B) comprises a matrix phase and an elastomer phase dispersed therein.

The heterophasic propylene copolymer (B) is characterized by
- a melt flow rate $MFR_2$ (230° C., 2.16 kg, ISO 1133) of 85 to 250 g/10 min, preferably of 90 to 150 g/10 min, more preferably of 95 to 125 g/10 min;
- a soluble fraction (SF) content determined according to CRYSTEX QC analysis in the range from 20.0 to 30.0 wt.-%, preferably from 21.0 to 28.0 wt.-%, more preferably from 21.0 to 26.0 wt.-%; and
- an intrinsic viscosity of said soluble fraction iV(SF), measured in decalin according to DIN ISO 1628/1 at 135° C., of 2.0 dl/g to 4.5 dl/g, preferably of 2.4 to 3.8 dl/g, more preferably of 2.5 to 3.7 dl/g.

Preferably the heterophasic propylene copolymer (B) has one or more, preferably all, of the following properties:
- a content of units derived from ethylene (C2) in the soluble fraction (SF) of 30 to 45 wt.-%, preferably of 32 to 40 wt.-%, more preferably of 33 to 38 wt.-%; and/or
- a content of units derived from ethylene (C2) in the crystalline fraction (CF) of 0.1 to 5.0 wt.-%, preferably of 0.2 to 4.0 wt. %, more preferably of 0.5 to 3.0 wt %; and/or
- a total content of units derived from ethylene (C2) of 5.0 to 15.0 wt.-%, preferably of 6.0 to 12.0 wt. %, more preferably of 7.0 to 10.0 wt %; and/or
- an intrinsic viscosity of the crystalline fraction iV(CF), determined according to CRYSTEX QC analysis and measured in decalin according to DIN ISO 1628/1 at 135° C. of 0.8 to 2.0 dl/g, preferably of 0.9 to 1.8 dl/g; and/or
- a melt temperature Tm of from 155 to 175° C., preferably from 157 to 172° C., more preferably from 160 to 170° C.; and/or
- a crystallization temperature Tc of from 120 to 140° C., preferably from 122 to 137° C., more preferably from 125 to 135° C.; and/or
- a tensile modulus of from 1250 MPa to 1800 MPa, preferably from 1300 MPa to 1750 MPa, more preferably from 1350 to 1700 MPa; and/or
- a Charpy Notched Impact Strength at 23° C. (CNIS at 23° C.) of from 4.0 to 8.5 $kJ/m^2$, preferably from 5.0 to 7.0 $kJ/m^2$.

It is preferred that the heterophasic propylene copolymer (B) consists of propylene units and ethylene units.

Although not measured the content of units derived from propylene (C3) in the soluble fraction (SF) preferably adds up to 100 wt.-% with the content of units derived from ethylene (C2) in the soluble fraction (SF).

The content of units derived from propylene (C3) in the soluble fraction (SF) is preferably 55 to 70 wt.-%, more preferably 60 to 68 wt.-%, still more preferably 62 to 67 wt.-%.

Although not measured the content of units derived from propylene (C3) in the crystalline fraction (CF) preferably adds up to 100 wt.-% with the content of units derived from ethylene (C2) in the crystalline fraction (CF).

The content of units derived from propylene (C3) in the crystalline fraction (CF) is preferably 95.0 to 99.9 wt.-%, more preferably 96.0 to 99.8 wt.-%, still more preferably 97.0 to 99.5 wt.-%.

The total content of units derived from propylene (C3) in the heterophasic propylene copolymer (B) is preferably 85.0 to 95.0 wt.-%, more preferably 88.0 to 94.0 wt.-%, still more preferably 90.0 to 93.0 wt.-%.

Such heterophasic propylene copolymers are commercially available.

Ethylene-Based Plastomer (C)

The ethylene-based plastomer (C) is preferably copolymer of ethylene with comonomer units selected from alpha-olefins having from 3 to 12 carbon atoms, preferably from alpha-olefins having from 4 to 10 carbon atoms, most preferably from 1-butene or 1-octene.

Ethylene-based plastomers are usually added for further improving the impact properties of the composition.

The ethylene-based plastomer (C) preferably has one or more, preferably all, of the following properties:
- a melt flow rate $MFR_2$ (190° C., 2.16 kg, ISO 1133) of 0.2 to 2.5 g/10 min, preferably 0.3 to 2.0 g/10 min; and
- a density of 850 to 870 $kg/m^3$, preferably from 855 to 865 $kg/m^3$.

Such ethylene-based plastomer are commercially available under the tradename Engage, Exact, Queo, Tafmer or others.

Inorganic Filler (D)

The inorganic filler (D) is preferably talc.

The inorganic filler, preferably talc, (D) preferably has a median particle size $d_{50}$ before compounding of 0.3 to 30.0 micrometers, more preferably 0.5 to 15.0 micrometers.

Further, the inorganic filler, preferably talc, (D) preferably has a top-cut particle size $d_{95}$ before compounding of 1.0 to 50.0 micrometers, preferably 1.5 to 35.0 micrometers.

Such inorganic fillers are commercially available.

Additives

Additives are commonly used in the composition according to the present invention. Preferably, the additives are selected from one or more of antioxidant(s), UV stabilizer(s), slip agent(s), nucleating agent(s), pigment(s), lubricant(s), masterbatch polymer(s) and/or anti-fogging agents.

Additives are usually present in the composition in an amount of from 0.01 to 4.0 wt.-%, preferably in an amount of 0.05 to 3.0 wt.-%, based on the total composition.

Second Heterophasic Propylene Copolymer (E)

The optional heterophasic polypropylene copolymer (E) comprises a matrix phase and an elastomer phase dispersed therein.

The second heterophasic propylene copolymer (E), if present in the composition, preferably has a melt flow rate which is lower than the melt flow rate of the heterophasic propylene copolymer (B).

The optional second heterophasic propylene copolymer (E) has a melt flow rate $MFR_2$ (230° C., 2.16 kg, ISO 1133) of 2 to 10 g/10 min, preferably of 3 to 8 g/10 min, more preferably of 4 to 7 g/10 min.

Further, the optional second heterophasic propylene copolymer (E) has a soluble fraction (SF) content determined according to CRYSTEX QC analysis in the range from more than 20.0 to 50.0 wt.-%, preferably in the range from 21.0 to 45.0 wt.-%, more preferably in the range from 22.0 to 40.0 wt.-%.

Said soluble fraction preferably has an intrinsic viscosity iV(SF), measured in decalin according to DIN ISO 1628/1 at 135° C., of 4.0 dl/g to 10.0 dl/g, preferably 4.5 to 9.5 dl/g, more preferably 5.0 to 9.0 dl/g.

The optional second heterophasic propylene copolymer (E) preferably has a crystalline fraction (CF) content determined according to CRYSTEX QC analysis in the range from 50.0 to 80.0 wt.-%, preferably in the range from 55.0 to 79.0 wt.-%, more preferably in the range from 60.0 to 78.0 wt.-%.

Preferably, the optional second heterophasic propylene copolymer (E) has one or more, preferably all, of the following properties:

- a content of units derived from ethylene (C2) in the soluble fraction (SF) of 25 to 35 wt.-%, preferably of 27 to 34 wt.-%, more preferably of 28 to 33 wt.-%; and/or
- a content of units derived from ethylene in the crystalline fraction (CF) of 0.5 to 7.5 wt.-%, preferably of 1.0 to 5.0 wt. %, more preferably of 1.5 to 4.0 wt %; and/or
- a total content of units derived from ethylene of 4.0 to 15.0 wt.-%, preferably of 5.0 to 12.0 wt. %, more preferably of 6.0 to 10.0 wt %; and/or
- an intrinsic viscosity of the crystalline fraction iV(CF) determined according to CRYSTEX QC analysis and measured in decalin according to DIN ISO 1628/1 at 135° C. in the range of 1.8 to 3.5 dl/g, preferably in the range of 2.0 to 3.0 dl/g; and/or
- a melt temperature Tm of from 155 to 175° C., preferably from 157 to 172° C., more preferably from 160 to 170° C.; and/or
- a crystallization temperature Tc of from 105 to 125° C., preferably from 107 to 122° C., more preferably from 110 to 120° C.

It is preferred that the optional heterophasic propylene copolymer (E) consists of propylene units and ethylene units.

Although not measured the content of units derived from propylene (C3) in the soluble fraction (SF) preferably adds up to 100 wt.-% with the content of units derived from ethylene (C2) in the soluble fraction (SF).

The content of units derived from propylene (C3) in the soluble fraction (SF) is preferably 65 to 75 wt.-%, more preferably 66 to 73 wt.-%, still more preferably 67 to 72 wt.-%.

Although not measured the content of units derived from propylene (C3) in the crystalline fraction (CF) preferably adds up to 100 wt.-% with the content of units derived from ethylene (C2) in the crystalline fraction (CF).

The content of units derived from propylene (C3) in the crystalline fraction (CF) is preferably 92.5 to 99.5 wt.-%, more preferably 95.0 to 99.0 wt.-%, still more preferably 96.0 to 98.5 wt.-%.

The total content of units derived from propylene (C3) in the heterophasic propylene copolymer (B) is preferably 85.0 to 96.0 wt.-%, more preferably 88.0 to 95.0 wt.-%, still more preferably 90.0 to 94.0 wt.-%.

The optional heterophasic propylene copolymer (E) preferably has a tensile modulus of from 800 MPa to 1200 MPa, preferably from 850 MPa to 1150 MPa.

Further, the optional heterophasic propylene copolymer (E) preferably has a Charpy Notched Impact Strength at 23° C. (CNIS, 23° C.) of from 25 to 75 kJ/m$^2$, preferably from 35 to 60 kJ/m$^2$.

Such heterophasic propylene copolymers are commercially available.

Propylene Homopolymer (F)

The optional propylene homopolymer (F) preferably has a very high melt flow rate MFR$_2$ (230° C., 2.16 kg, ISO 1133) of 800 to 2000 g/10 min, preferably of 900 to 1600 g/10 min, more preferably of 1000 to 1500 g/10 min.

Further, the optional propylene homopolymer (F) preferably has a melting temperature Tm, determined by DSC according to ISO 11357-3, of from 150 to 170° C., preferably from 155 to 166° C.

Such propylene homopolymers are usually added for further improving the flowability of the composition.

Such propylene homopolymers are commercially available.

Article

In another aspect, the present invention relates to an article, preferably a moulded article, more preferably a moulded automotive article comprising the composition as described above or below.

The article is preferably used on the exterior of vehicles.

The article preferably shows a paint adhesion assessed as the failed or delaminated coated area.

It is preferred that the article has a failed or delaminated coated area in mm$^2$ of below 50 mm$^2$, preferably from 0 to 45 mm$^2$.

Use

In yet another aspect the present invention relates to the use of the composition as described above or below for injection molding of articles, preferably automotive articles, more preferably automotive exterior articles.

Experimental Section

The following Examples are included to demonstrate certain aspects and embodiments of the invention as described in the claims. It should be appreciated by those of skill in the art, however, that the following description is illustrative only and should not be taken in any way as a restriction of the invention.

Test Methods a) Crystex

Determination of Crystalline and Soluble Fractions and their Respective Properties (IV and Ethylene Content)

The crystalline (CF) and soluble fractions (SF) of the polypropylene (PP) compositions as well as the comonomer content and intrinsic viscosities of the respective fractions were analyzed by use of the CRYSTEX instrument, Polymer Char (Valencia, Spain). Details of the technique and the method can be found in literature (Ljiljana Jeremic, Andreas Albrecht, Martina Sandholzer & Markus Gahleitner (2020) Rapid characterization of high-impact ethylene-propylene copolymer composition by crystallization extraction separation: comparability to standard separation methods, International Journal of Polymer Analysis and Characterization, 25:8, 581-596)

The crystalline and amorphous fractions are separated through temperature cycles of dissolution at 160° C., crystallization at 40° C. and re-dissolution in 1,2,4-trichlorobenzene at 160° C. Quantification of SF and CF and determination of ethylene content (C2) are achieved by means of an integrated infrared detector (IR4) and for the determination of the intrinsic viscosity (iV) an online 2-capillary viscometer is used.

The IR4 detector is a multiple wavelength detector measuring IR absorbance at two different bands (CH$_3$ stretching vibration (centred at app. 2960 cm$^{-1}$) and the CH stretching vibration (2700-3000 cm$^{-1}$) that are serving for the determination of the concentration and the Ethylene content in Ethylene-Propylene copolymers. The IR4 detector is calibrated with series of 8 EP copolymers with known Ethylene content in the range of 2 wt.-% to 69 wt.-% (determined by $^{13}$C-NMR) and each at various concentrations, in the range of 2 and 13 mg/ml. To encounter for both features, concentration and ethylene content at the same time for various polymer concentrations expected during Crystex analyses the following calibration equations were applied:

$$Conc = a + b*\text{Abs(CH)} + c*(\text{Abs(CH)})^2 + \qquad \text{(Equation 1)}$$
$$d*\text{Abs(CH}_3) + e*(\text{Abs(CH}_3))^2 + f*\text{Abs(CH)}*\text{Abs(CH}_3)$$

$$CH_3/1000C = a + b*\text{Abs(CH)} + c*\text{Abs(CH}_3) + \qquad \text{(Equation 2)}$$
$$d*(\text{Abs(CH}_3)/\text{Abs(CH)}) + e*(\text{Abs(CH}_3)/\text{Abs(CH)})^2$$

The constants a to e for equation 1 and a to f for equation 2 were determined by using least square regression analysis.

The $CH_3/1000$ C is converted to the ethylene content in wt.-% using following relationship:

$$\text{wt.}-\% \text{ (Ethylene in } EP \text{ Copolymers)} = \qquad \text{(Equation 3)}$$
$$100 - CH_3/1000TC * 0.3$$

Amounts of Soluble Fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 wt.-%. The determined XS calibration is linear:

$$\text{wt.}-\% \text{ } XS = 1.01 * \text{wt } \% \text{ } SF \qquad \text{(Equation 4)}$$

Intrinsic viscosity (iV) of the parent EP copolymer and its soluble and crystalline fractions are determined with a use of an online 2-capillary viscometer and are correlated to corresponding iV's determined by standard method in decalin according to ISO 1628-3. Calibration is achieved with various EP PP copolymers with iV=2-4 dL/g. The determined calibration curve is linear:

$$iV(\text{dL/g}) = a * Vsp/c \qquad \text{(equation 5)}$$

The samples to be analyzed are weighed out in concentrations of 10 mg/ml to 20 mg/ml. To avoid injecting possible gels and/or polymers which do not dissolve in TCB at 160° C., like PET and PA, the weighed out sample was packed into a stainless steel mesh MW 0,077/D 0.05 mmm.

After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 400 rpm. To avoid sample degradation, the polymer solution is blanketed with the N2 atmosphere during dissolution.

A defined volume of the sample solution is injected into the column filled with inert support where the crystallization of the sample and separation of the soluble fraction from the crystalline part is taking place. This process is repeated two times. During the first injection the whole sample is measured at high temperature, determining the iV [dl/g] and the C2 [wt.-%] of the PP composition. During the second injection the soluble fraction (at low temperature) and the crystalline fraction (at high temperature) with the crystallization cycle are measured (wt.-% SF, wt.-% C2, iV).

b) Xylene Cold Soluble Fraction (XCS, Wt %)

Xylene cold soluble fraction (XCS) was determined at 25° C. according ISO 16152; first edition; 2005-07-01. The part which remains insoluble is the xylene cold insoluble (XCI) fraction.

c) Intrinsic Viscosity

Intrinsic viscosity was measured according to DIN ISO 1628/1, October 1999 (in Decalin at 135° C.).

d) Charpy Notched Impact Strength was determined according to ISO 179-1 eA at +23° C. and at −20° C. on injection molded specimens of 80×10×4 mm³ prepared according to EN ISO 1873-2. The measurement was done after 96 h conditioning time at 23° C. of the specimen.

e) Flexural Modulus

The flexural modulus was determined according to ISO 178 at a test speed of 2 mm/min and a force of 100 N, whereby the length of the span between the supports was 64 mm, on test specimens having a dimension of 80×10×4 mm³ (length×width×thickness) prepared by injection moulding according to EN ISO 1873-2.

f) Tensile Modulus was measured according to ISO 527-2 (cross head speed=1 mm/min; test speed 50 mm/min at 23° C.) using injection molded specimens 1B prepared as described in EN ISO 1873-2 (dog bone shape, 4 mm thickness). The measurement was done after 96 h conditioning time at 23° C. of the specimen.

g) Instrumented Puncture Test

Instrumented puncture test was performed on 60×60×3 mm³ injection-molded plaques at 23° C. and −30° C. according to ISO6603-2:2000. The measurement was done after 96 h conditioning time at 23° C. of the specimen.

h) Comonomer Content

Poly(Propylene-Co-Ethylene)-Ethylene Content-IR Spectroscopy

Quantitative infrared (IR) spectroscopy was used to quantify the ethylene content of the poly(ethylene-co-propene) copolymers through calibration to a primary method. Calibration was facilitated through the use of a set of in-house non-commercial calibration standards of known ethylene contents determined by quantitative $^{13}C$ solution-state nuclear magnetic resonance (NMR) spectroscopy. The calibration procedure was undertaken in the conventional manner well documented in the literature. The calibration set consisted of 38 calibration standards with ethylene contents ranging 0.2-75.0 wt. % produced at either pilot or full scale under a variety of conditions. The calibration set was selected to reflect the typical variety of copolymers encountered by the final quantitative IR spectroscopy method. Quantitative TR spectra were recorded in the solid-state using a Bruker Vertex 70 FTIR spectrometer. Spectra were recorded on 25×25 mm square films of 300 μm thickness prepared by compression moulding at 180-210° C. and 4-6 MPa. For samples with very high ethylene contents (>50 mol %) 100 μm thick films were used. Standard transmission FTIR spectroscopy was employed using a spectral range of 5000-500 $cm^{-1}$, an aperture of 6 mm, a spectral resolution of 2 $cm^{-1}$, 16 background scans, 16 spectrum scans, an interferogram zero filling factor of 64 and Blackmann-Harris 3-term apodisation. Quantitative analysis was undertaken using the total area of the $CH_2$ rocking deformations at 730 and 720 $cm^{-1}$ ($A_Q$) corresponding to $(CH_2)_{>2}$ structural units (integration method G, limits 762 and 694 $cm^{-1}$). The quantitative band was normalised to the area of the CH band at 4323 $cm^{-1}$ ($A_R$) corresponding to CH structural units (integration method G, limits 4650, 4007 $cm^{-1}$). The ethylene content in units of weight percent was then predicted from the normalised absorption ($A_Q/A_R$) using a quadratic calibration curve. The calibration curve having previously been constructed by ordinary least squares (OLS) regression of the normalised absorptions and primary comonomer contents measured on the calibration set.

Poly(Propylene-Co-Ethylene)-Ethylene Content-$^{13}$C NMR Spectroscopy

Quantitative $^{13}$C{$^1$H} NMR spectra were recorded in the solution-state using a Bruker Avance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475).

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., et al. J. Mag. Reson. 187 (2007) 225, and in Busico, V., et al, Macromol. Rapid Commun. 2007, 28, 1128). A total of 6144 (6 k) transients were acquired per spectra. Quantitative $^{13}$C{$^1$H} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E) The comonomer fraction was quantified using the method of Wang et. al. (Wang, W-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents. For systems with very low ethylene content where only isolated ethylene in PPEPP sequences were observed the method of Wang et. al. was modified reducing the influence of integration of sites that are no longer present. This approach reduced the overestimation of ethylene content for such systems and was achieved by reduction of the number of sites used to determine the absolute ethylene content to E=0.5(Sββ+Sβγ+Sβδ+0.5(Sαβ+Sαγ)) Through the use of this set of sites the corresponding integral equation becomes E=0.5(I$_H$+I$_G$+0.5(I$_C$+I$_D$)) using the same notation used in the article of Wang et. al. (Wang, W-J., Zhu, S., Macromolecules 33 (2000), 1157). Equations used for absolute propylene content were not modified. The mole percent comonomer incorporation was calculated from the mole fraction: E [mol %]=100*fE. The weight percent comonomer incorporation was calculated from the mole fraction: E [wt. %]=100*(fE*28.06)/((fE*28.06)+((1−fE)*42.08)).

i) Comonomer Content

Contents were determined using a film thickness method using the intensity of the quantitative band I(q) and the thickness of the pressed film T using the following relationship: [I(q)/T]m+c=C where m and c are the coefficients determined from the calibration curve constructed using the comonomer contents obtained from $^{13}$C-NMR spectroscopy.

Comonomer content was measured in a known manner based on Fourier transform infrared spectroscopy (FTIR) calibrated with $^{13}$C-NMR, using Nicolet *Magna* 550 IR spectrometer together with Nicolet Omnic FTIR software. Films having a thickness of about 250 m were compression molded from the samples. Similar films were made from calibration samples having a known content of the comonomer. The comonomer content was determined from the spectrum from the wave number range of from 1430 to 1100 cm$^{-1}$. The absorbance was measured as the height of the peak by selecting the so-called short or long base line or both. The short base line was drawn in about 1410-1320 cm$^{-1}$ through the minimum points and the long base line about between 1410 and 1220 cm$^{-1}$. Calibrations needed to be done specifically for each base line type. Also, the comonomer content of the unknown sample was within the range of the comonomer contents of the calibration samples.

j) MFR

Melt flow rates were measured with a load of 2.16 kg (MFR$_2$) at 230° C. (polypropylene based materials) or at 190° C. (polyethylene based materials). The melt flow rate is that quantity of polymer in grams which the test apparatus standardized to ISO 1133 extrudes within 10 minutes at a temperature of 230° C. (or 190° C.) under a load of 2.16 kg.

k) Density

Density was measured according to ISO 1183-187. Sample preparation was done by compression molding in accordance with ISO 1872-2:2007.

l) Heat Deflection Temperature (HDT)

The HDT was determined on injection molded test specimens of 80×10×4 mm$^3$ prepared according to ISO 1873-2 and stored at +23° C. for at least 96 hours prior to measurement. The test was performed on flatwise supported specimens according to ISO 75, condition B, with a nominal surface stress of 0.45 MPa.

m) Coefficient of Linear Thermal Expansion (CLTE)

The coefficient of linear thermal expansion (CLTE) was determined in accordance with ISO 11359-2:1999 on 10 mm long pieces cut 20 from the same injection molded specimens as used for the tensile modulus determination. The measurement was performed in a temperature range from −30 to +80° C. at a heating rate of 1° C./min and a temperature range from 23 to +80° C. at a heating rate of 1° C./min in machine direction, respectively.

n) Paint Adhesion

Adhesion is characterized as the resistance of decorative coatings such as paints when subjected to high-pressure cleaner washing following certain conditions as described below.

Injection moulded sample plates (150 mm×80 mm×3 mm) were produced at 240° C. melt temperature and 50° C. mold temperature. The flow front velocity was 100 mm/s. Prior coating, the plaques were cleaned with Zeller Gmelin Divinol® mm/s for 5 min. Subsequently, the surface was activated via flaming, where a burner at a speed of 670 mm/s spreads a mixture of propane (9 l/min) and air (180 l/min) in a ratio of 1:20 on the polymer substrate. Afterwards, the polymer substrate was coated with 3 layers, i.e. a primer, base coat (black) and a clear coat. The step of flaming was performed two times.

The decorative coating was incised down to the substrate at a total depth of about 500 ▢m (including coating and substrate) with a cutting tool making a cross with 100 mm long branches. On each coated substrate, 3 lines with the corresponding cross were incised. The incised area was further exposed to a steam of hot water with temperature T was directed for time t at distance d under angle α to the surface of the test panel. Pressure of the water jet results from the water flow rate and is determined by the type of nozzle installed at the end of the water pipe.

The following parameters were used:

T(water)=68° C.; t=30 s; d=100 mm, α=90°, water pressure of 65 bar, nozzle type=Walter 13/32.

The adhesion was assessed by quantifying the failed or delaminated coated area in mm² per test line. For each example, 5 panels (150 mm×80 mm×3 mm) have been tested. For this purpose, an image of the test line before and after steam jet exposure was taken. Then the delaminated area was calculated with an image processing software. The average failed area for 3 test lines on 5 test specimens (i.e. in total the average of 15 test points) was reported as average failed area. SD is the standard deviation, which is determined according to the following formula:

$$\text{Sample standard deviation} = \sqrt{\frac{\Sigma(x - \bar{x})^2}{(n - 1)}}$$

wherein:
x are the observed values;
x̄ is the mean of the observed values; and
n is the number of observations.

Experiments
Catalyst System:

For the polymerization process of HECO 1, a Ziegler-Natta type catalyst as used for the inventive examples of WO 2016/066446 A1 and described pre-polymerized with vinylcyclohexane to achieve nucleation with poly(vinylcyclohexane) was used. Nucleation by prepolymerization with vinylcyclohexane is described in EP 2 960 256 B1 and EP 2 960 279 B1 in detail. These documents are incorporated by reference.

For the polymerization process of HECO 2 and HECO 3 a traditional trans-esterified high yield MgCl$_2$-supported Ziegler-Natta polypropylene catalyst component comprising diethyl phthalate as internal donor was used. The catalyst component and its preparation concept are described in general for example in patent publications EP491566, EP591224 and EP586390.

Accordingly, the catalyst component was prepared as follows: first, 0.1 mol of MgCl$_2$×3 EtOH was suspended under inert conditions in 250 ml of decane in a reactor at atmospheric pressure. The solution was cooled to −15° C. and the 300 ml of cold TiCl$_4$ was added while maintaining the temperature at said temperature. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried.

HECO1, HECO 2 and HECO 3 were made in prepolymerization/loop reactor/gas phase reactor 1/gas phase reactor 2/gas phase reactor 3 configuration followed by a pelletization step. The catalyst system defined above was used in combination with triethyl-aluminium (TEAL) as co-catalyst and dicyclopentadienyl-dimethoxy silane (donor D) as external donor.

TABLE 1

Preparation of HECO 1, HECO 2 and HECO 3

| | | HECO 1 | HECO 2 | HECO 3 |
|---|---|---|---|---|
| Catalyst | | as described above | as described above | |
| Donor | | D | D | D |
| Prepoly | | | | |
| Co/ED | mol/mol | 7.0 | 10.0 | 10.0 |
| Co/Ti | mol/mol | 390 | 220 | 200 |
| Temperature | ° C. | 28 | 30 | 30 |
| Residence time | min | 0.27 | 0.08 | 0.26 |
| Loop | | | | |
| Temperature | ° C. | 75 | 75 | 76 |
| Pressure | kPa | 5500 | 5400 | 5400 |
| Split | wt.-% | 44 | 52 | 47.5 |
| H2/C3 | mol/kmol | 36.7 | 22 | 24.70 |
| MFR | g/10 min | 511 | 160 | 160 |
| XCS | wt.-% | | | 2.1 |
| GPR1 | | | | |
| Temperature | ° C. | 80 | 80 | 80 |
| Pressure | kPa | 2100 | 2600 | 2400 |
| Split | wt.-% | 38 | 34 | 31.70 |
| H2/C3 | mol/kmol | 203 | 175 | 44.80 |
| MFR | g/10 min | 339 | 160 | 55 |
| XCS | wt.-% | 2.5 | 2.0 | 2.0 |
| GPR2 | | | | |
| Temperature | ° C. | 75 | 80 | 67 |
| Pressure | kPa | 1900 | 2500 | 2100 |
| C2/C3 | mol/kmol | 119 | 550 | 242 |
| H2/C2 | mol/kmol | 172 | 250 | 22.80 |
| Split | wt.-% | 11 | 14 | 11.70 |
| C2 | wt.-% | 3.3 | 8.0 | 6.9 |
| MFR | g/10 min | 120 | 100 | 20 |
| XCS | wt.-% | 12.2 | 15.0 | 18.0 |
| GPR3 | | | | |
| Temperature | ° C. | 80 | — | 67 |
| Pressure | kPa | 1700 | — | 1500 |
| C2/C3 | mol/kmol | 351 | — | 250.0 |
| H2/C2 | mol/kmol | 45.5 | — | 22.40 |
| Split | wt.-% | 7 | 0 | 9.10 |
| Pellet | | | | |
| XCS | wt.-% | 21.5 | 15.0 | 25 |
| C2(total) | wt.-% | 8.6 | 7.5 | 7.6 |
| C2(XCS) | wt % | 35.8 | 39.0 | 20.8 |
| iV(XCS) | dl/g | 3.1 | 2.9 | 6.3 |
| MFR | g/10 min | 100 | 100 | 5.0 |
| Tm | ° C. | 165 | 165 | 166 |
| Tc | ° C. | 128 | 118 | 115 |

The heterophasic copolymers HECO 1, HECO 2 and HECO 3 were compounded in a co-rotating twin-screw extruder Coperion ZSK 47 at 220° C. with 0.15 wt.-% antioxidant (Irganox B215FF from BASF AG, Germany; this is a 1:2-mixture of Pentaerythrityl-tetrakis(3-(3',5'-di-tert. butyl-4-hydroxyphenyl)-propionate, CAS-no. 6683-19-8, and Tris (2,4-di-t-butylphenyl) phosphite, CAS-no. 31570-04-4); 0.05 wt.-% of Ca-stearate (CAS-no. 1592-23-0, commercially available from Faci, Italy). The CRYSTEX QC analysis of these three copolymers gave the results listed in Table 2.

TABLE 2

CRYSTEX QC analysis of HECO 1, HECO 2 and HECO 3

|  |  | HECO 1 | HECO 2 | HECO 3 |
|---|---|---|---|---|
| CF | wt.-% | 78.0 | 85.3 | 78.2 |
| C2(CF) | wt.-% | 1.1 | 2.4 | 2.0 |
| iV(CF) | dl/g | 1.0 | 1.2 | 1.8 |
| SF | wt.-% | 22.0 | 14.7 | 23.3 |
| C2(SF) | wt.-% | 35.0 | 39.5 | 23 |
| iV(SF) | dl/g | 3.4 | 3.1 | 5.5 |

Table 3 shows the properties of the polypropylene/polyethylene blends (A) as used for the evaluation. As these compositions come from a mechanical recycling process, the properties are indicated as ranges.

TABLE 3

Properties of Polypropylene/Polyethylene Blends Mixtures (Blend A)

|  | Blend A |
|---|---|
| PP/PE ratio | 11:1 |
| C2 (Blend A, total) wt.-% | 6.6-8.3 |
| Recycling origin | Yes, households |
| limonene | >0.1 ppm |
| MFR$_2$ (230° C., ISO1133), g/10 min | 12.0-15.0 |
| CF (CRYSTEX), wt % | 89.7-90.3 |
| iV (CF), dl/g | 1.80 |
| C2 (CF), wt % | 5.7-7.4 |
| SF (CRYSTEX), wt % | 9.7-10.3 |
| iV (SF), dl/g | 1.20-1.65 |
| C2 (SF), wt % | 27.0-29.0 |
| Tensile modulus, ISO 527-2, MPa | 1200-1280 |
| Charpy NIS + 23° C., ISO 179 1eA, kJ/m$^2$ | 4.8-5.8 |

Plastomer 1 was Engage HM 7487, being an ethylene-1-butene plastomer with a density of 860 kg/m$^3$ and a MFR$_2$ (2.16 kg, 190° C., ISO1133) of <0.5 g/10 min, commercially available from DOW, Inc, USA.

Plastomer 2 was Engage 8842, being an ethylene-1-octene plastomer with a density of 857 kg/m$^3$ and a MFR$_2$ (2.16 kg, 190° C., ISO1133) of 1.0 g/10 min, commercially available from DOW, Inc, USA.

Talc 1 was Jetfine 3CA with a d$_{50}$ of 1.2 µm and a d$_{95}$ of 3.3 µm (Sedigraph measurement), commercially available from IMERYS, France.

Talc 2 was Luzenac HAR T84 with a d$_{50}$ of 2.0 µm and a d$_{95}$ of 10.0 µm (Sedigraph measurement), commercially available from IMERYS.

PP-Homo was the commercial propylene homopolymer HL712FB with an MFR$_2$ (2.16 kg, 230° C., ISO1133) of 1200 g/10 min and a Tm (DSC, ISO 11357-3) of 158° C.

The final compositions were compounded in a Coperin ZSK40 twin-screw extruder at 220° C. using the polymers and talc together with antioxidants, UV-stabilizers, slip agents, nucleating agents, carbon black masterbatch, calcium stearate, antifogging agent. The compositions of the examples are shown in Table 4.

TABLE 4

Compositions of the examples

|  | CE1 | CE2 | IE1 | IE2 | IE3 | IE4 |
|---|---|---|---|---|---|---|
| HECO1, wt % | — | — | 42.23 | 30.23 | 30.23 | 35.23 |
| HECO2, wt % | 50.21 | 24.11 | — | — | — | — |
| HECO3, wt % | 15.00 | 15.00 | — | 15.00 | — | — |
| Blend A, wt % | — | 25.00 | 25.00 | 25.00 | 25.00 | 25.00 |
| Plastomer 1, wt % | 17.00 | 17.00 | 15.00 | 12.00 | — | — |
| Plastomer 2, wt % | — | — | — | — | 20.00 | 15.00 |
| Talc 1, wt % | 15.50 | 15.50 | 15.50 | 15.50 | — | — |
| Talc 2, wt % | — | — | — | — | 15.50 | 15.50 |
| PP-Homo, wt % | — | — | — | — | 7.00 | 7.00 |
| Irgafos 168, wt % | 0.07 | 0.07 | 0.10 | 0.10 | 0.10 | 0.10 |
| Irganox 1010, wt % | 0.20 | 0.20 | 0.15 | 0.15 | 0.15 | 0.15 |
| Slip agent (Oleamide), wt % | 0.20 | 0.20 | 0.20 | 0.20 | 0.20 | 0.20 |
| UV stabilizer (Chimassorb 119), wt % | — | 0.40 |  |  |  |  |
| UV stabilizer (Sabostab UV228 50 PP) | — | 0.2 |  |  |  |  |
| Carbon black master batch (CBMB-LD-09), wt % | 1.50 | 2.00 | 1.50 | 1.50 | 1.50 | 1.50 |
| Acid scavenger (Ca-stearate), wt % | 0.20 | 0.20 | 0.20 | 0.20 | 0.20 | 0.20 |
| Antifogging agent (GMS 90), wt % | 0.12 | 0.12 | 0.12 | 0.12 | 0.12 | 0.12 |

Table 5 shows the properties of the examples.

TABLE 5

Properties of the examples

|  | CE1 | CE2 | IE1 | IE2 | IE3 | IE4 |
|---|---|---|---|---|---|---|
| MFR$_2$, g/10 min | 20 | 10.5 | 17 | 12 | 25 | 40 |
| C2 (Comp), wt % | 19.1 | 21.4 | 20.8 | 18.0 | 26.1 | 20.1 |
| iV (Comp), dl/g | 1.78 | 1.89 | 1.67 | 1.84 | 1.41 | 1.43 |
| CF (CRYSTEX), wt % | 66.1 | 66.4 | 66.7 | 69.7 | 63.0 | 69.0 |
| C2 (CF), wt % | 3.1 | 5.5 | 5.6 | 5.2 | 5.5 | 4.2 |
| iV (CF), dl/g | 1.26 | 1.70 | 1.38 | 1.52 | 1.22 | 1.22 |

TABLE 5-continued

Properties of the examples

|  | CE1 | CE2 | IE1 | IE2 | IE3 | IE4 |
|---|---|---|---|---|---|---|
| SF (CRYSTEX), wt % | 33.9 | 33.6 | 33.3 | 30.3 | 37.0 | 31.0 |
| C2 (SF), wt % | 53.5 | 54.5 | 52.5 | 47.3 | 62.0 | 58.0 |
| iV (SF), dl/g | 2.60 | 2.3 | 2.25 | 2.55 | 1.78 | 1.92 |
| Flexural modulus, MPa | 1760 | 1571 | 1595 | 1644 | 1526 | 1918 |
| Tensile modulus, MPa | 1684 | 1465 | 1531 | 1596 | n.m. | n.m. |
| Charpy NIS, +23° C., kJ/m$^2$ | 27 | 51 | 35 | 45 | 47 | 22 |
| Charpy NIS, −20° C., kJ/m$^2$ | 5.8 | 5.9 | 5.2 | 5.0 | 6.7 | 4.6 |
| Energy at max force, +23° C., J | 21 | 21 | 21 | 21 | 20 | 21 |
| Puncture energy, +23° C., J | 36 | 37 | 34 | 37 | 35 | 38 |
| Energy at max force, −30° C., J | 28 | 24 | 17 | 12 | 26 | 19 |
| Puncture energy, −30° C., J | 31 | 26 | 19 | 14 | 32 | 19 |
| HDT (ISO 75 B), ° C. | 102 | 92 | 97 | 98 | 92 | 104 |
| CLTE, +23/80° C., μm/mK, MD | 73 | 74 | 80 | 83 | 70 | 79 |
| Delaminated painted area, mm$^2$ | 25 | 2 | 6 | 8 | 22 | 44 | n.m. = not measured

Example IE2 shows that by using HECO 1 instead of HECO 2 in CE2 better mechanical properties and better thermal stability at comparable impact properties, flowability and good paint adhesion can be obtained.

Example IE1 shows that omitting HECO 3 can further increase the flowability without sacrificing the other properties.

Addition of PP-Homo in examples IE3 and IE4 shows an increase of flowability. Thereby, when using a lower amount of plastomer in IE4 an extraordinary mechanical behavior and thermal stability can be obtained. However, addition of PP-Homo comes with the price of impaired paintability.

The invention claimed is:

1. A composition suitable for automotive applications:
obtained by blending at least components (A), (B), (C) and (D)
(A) 15 wt % to 50 wt % of a mixed-plastics polypropylene blend;
(B) 20 wt % to 50 wt % of a heterophasic propylene copolymer;
(C) 5 wt % to 25 wt % of an ethylene-based plastomer and
(D) 5 wt % to 25 wt % of an inorganic filler;
whereby all percentages refer to a total composition, and whereby
the mixed-plastics polypropylene blend (A) has
a crystalline fraction (CF) content determined according to CRYSTEX QC analysis in a range from 85.0 to 96.0 wt %, and
a soluble fraction (SF) content determined according to CRYSTEX QC analysis in a range from 4.0 to 15.0 wt %, whereby
said crystalline fraction (CF) has an ethylene content (C2(CF)), as determined by FT-IR spectroscopy calibrated by quantitative $^{13}$C-NMR spectroscopy, in a range from 1.0 to 10.0 wt %; and
said soluble fraction (SF) has an intrinsic viscosity (iV(SF)) in a range from 0.9 to 2.1 dl/g;
the heterophasic propylene copolymer (B) comprises a matrix phase and an elastomer phase dispersed therein and has:
a melt flow rate MFR$_2$ (230° C., 2.16 kg, ISO 1133) of 85 to 250 g/10 min;
a soluble fraction (SF) content determined according to CRYSTEX QC analysis in a range from more than 20.0 wt % to 30.0 wt %; and
an intrinsic viscosity of said soluble fraction iV(SF), as measured in decalin according to DIN ISO 1628/1 at 135° C., of 2.0 dl/g to 4.5 dl/g;
the ethylene based plastomer (C) is a copolymer of ethylene with comonomer units selected from alpha-olefins having from 3 to 12 carbon atoms, and has:
a melt flow rate MFR$_2$ (190° C., 2.16 kg, ISO 1133) of 0.2 to 2.5 g/10 min; and
a density of 850 to 870 kg/m$^3$;
the composition has a:
a melt flow rate MFR$_2$ (230° C., 2.16 kg, ISO 1133) of 8 to 50 g/10 min.

2. The composition according to claim 1, obtained by blending components (A), (B), (C), (D) and one or more of the following components:
(E) 0 to 20 wt % of a second heterophasic propylene copolymer; and
(F) 0 to 10 wt % of a propylene homopolymer;
whereby all percentages refer to the total composition, and whereby
the second heterophasic propylene copolymer (E) comprises a matrix phase and an elastomer phase dispersed therein and has:
a melt flow rate MFR$_2$ (230° C., 2.16 kg, ISO 1133) of 2 to 10 g/10 min;
a soluble fraction (SF) content determined according to CRYSTEX QC analysis of more than 20.0 to 50.0 wt %; and
an intrinsic viscosity of said soluble fraction iV(SF), measured in decalin according to DIN ISO 1628/1 at 135° C., of 4.0 dl/g to 10.0 dl/g;
the propylene homopolymer (F) has:
a melt flow rate MFR$_2$ (230° C., 2.16 kg, ISO 1133) of 800 to 2000 g/10 min.

3. The composition according to claim 2, obtained by blending components (A), (B), (C) and (D), with (E) and (F) not being present,
(A) 15 wt % to 50 wt % of a mixed-plastics polypropylene blend;
(B) 30 wt % to 50 wt % of a heterophasic propylene copolymer;
(C) 5 wt % to 25 wt % of an ethylene-based plastomer and
(D) 5 wt % to 25 wt % of an inorganic filler.

4. The composition according to claim 2, obtained by blending components (A), (B), (C), (D) and (E), with (F) not being present, (A) 15 wt % to 40 wt % of a mixed-plastics polypropylene blend;
(B) 20 wt % to 50 wt % of a heterophasic propylene copolymer;
(C) 5 wt % to 25 wt % of an ethylene-based plastomer;
(D) 5 wt % to 25 wt % of an inorganic filler; and
(E) 5 wt % to 20 wt % of a second heterophasic propylene copolymer.

5. The composition according to claim 2, obtained by blending components (A), (B), (C), (D) and (F), with (E) not being present,
(A) 15 wt % to 40 wt % of a mixed-plastics polypropylene blend;
(B) 20 wt % to 50 wt % of a heterophasic propylene copolymer;
(C) 5 wt % to 25 wt % of an ethylene-based plastomer;
(D) 5 wt % to 25 wt % of an inorganic filler; and
(F) 2 wt % to 10 wt % of a propylene homopolymer.

6. The composition according to claim 1, wherein the inorganic filler (D) is talc having:
a median particle size $d_{50}$ before compounding of 0.3 to 30.0 micrometers; and/or
a top-cut particle size $d_{95}$ before compounding of 1.0 to 50.0 micrometers.

7. The composition according to claim 1, wherein the composition has:
a crystalline fraction (CF) content determined according to CRYSTEX QC analysis in a range from 55.0 to 75.0 wt %, and
a soluble fraction (SF) content determined according to CRYSTEX QC analysis in a range from 25.0 to 45.0 wt % whereby
said crystalline fraction (CF) has an ethylene content (C2(CF)), as determined by FT-IR spectroscopy calibrated by quantitative $^{13}$C-NMR spectroscopy, of less than 10.0 wt %;
said crystalline fraction (CF) has an intrinsic viscosity (iV(CF)) of less than 1.8 dl/g;
said soluble fraction (SF) has an ethylene content (C2 (SF)), as determined by FT-IR spectroscopy calibrated by quantitative $^{13}$C-NMR spectroscopy, in a range from 45.0 to 65.0 wt %; and
said soluble fraction (SF) has an intrinsic viscosity (iV (SF)) of more than 1.6 dl/g.

8. The composition according to claim 1, wherein the composition has a flexural modulus of from 1400 MPa to 2000 MPa.

9. The composition according to claim 1, wherein the composition has a Charpy Notched Impact Strength at 23° C. of from 20.0 KJ/m$^2$ to 65.0 KJ/m$^2$ and/or a Charpy Notched Impact Strength at −20° C. of from 4.0 KJ/m$^2$ to 10.0 KJ/m$^2$.

10. The composition according to claim 1, wherein the composition has a heat deflection temperature (ISO 75 B) of more than 90° C. and/or a coefficient of linear thermal expansion (CLTE) of from 60 to 100 μm/mK.

11. The composition according to claim 1, wherein the composition has a puncture energy of from 25 to 55 J and/or an energy at maximum force of from 15 to 45 J, when determined in the instrumented falling weight test according to ISO 6603-2 at 23° C., and/or puncture energy of from 12 to 40 J and/or an energy at maximum force of from 10 to 30 J, when determined in the instrumented falling weight test according to ISO 6603-2 at −30° C.

12. An article comprising the composition according to claim 1.

13. The article according to claim 12, wherein the article has paint adhesion assessed as the failed or delaminated coated area in mm$^2$ of below 50 mm$^2$.

\* \* \* \* \*